(12) United States Patent
Adelberg et al.

(10) Patent No.: US 7,702,143 B2
(45) Date of Patent: Apr. 20, 2010

(54) METHOD AND APPARATUS FOR IDENTIFYING MICR CHARACTERS

(76) Inventors: Larry Adelberg, 440 Sailmarer Cir., Alpharetta, GA (US) 30022; Bradley Singletary, 684 Fox Hunter Rd., Maynardville, TN (US) 37807

( * ) Notice: Subject to any disclaimer, the term of this patent is extended or adjusted under 35 U.S.C. 154(b) by 892 days.

(21) Appl. No.: 11/336,335

(22) Filed: Jan. 20, 2006

(65) Prior Publication Data
US 2007/0172110 A1 Jul. 26, 2007

(51) Int. Cl.
*G06K 9/00* (2006.01)
(52) U.S. Cl. .................................................. 382/139
(58) Field of Classification Search ................ 382/139
See application file for complete search history.

(56) References Cited

U.S. PATENT DOCUMENTS

| | | | |
|---|---|---|---|
| 3,629,829 A * | 12/1971 | Ordower | 382/139 |
| 3,764,978 A | 10/1973 | Tyburski et al. | |
| 3,949,363 A | 4/1976 | Holm | |
| 4,143,356 A | 3/1979 | Nally | |
| 4,399,553 A * | 8/1983 | Toyama | 382/139 |
| 6,769,615 B2 * | 8/2004 | Resseguie | 235/449 |
| 6,986,464 B2 | 1/2006 | Takiguchi et al. | |
| 7,480,403 B2 | 1/2009 | Kruppa et al. | |
| 2003/0161523 A1 | 8/2003 | Moon et al. | |
| 2006/0088199 A1 | 4/2006 | Shizuka et al. | |
| 2007/0172108 A1 | 7/2007 | Adelberg et al. | |
| 2007/0172109 A1 | 7/2007 | Agrawal et al. | |

\* cited by examiner

*Primary Examiner*—Tom Y Lu
(74) *Attorney, Agent, or Firm*—Fitch, Even, Tabin & Flannery

(57) ABSTRACT

A method and apparatus for reading MICR characters is disclosed, in which both magnetic and optical data may be read and stored. Each type of data is analyzed to identify possible character values. In one disclosed analysis method, the data is first evaluated in a coarse analysis then analyzed using a fine analysis which may lead to the identification of characters. The analysis of characters may involve generating frequency spectrum data from scanned data and assigning character values based on the frequency spectrum data.

7 Claims, 3 Drawing Sheets

METHOD AND APPARATUS FOR IDENTIFYING MICR CHARACTERS

BACKGROUND OF THE INVENTION

The present invention relates to optical and magnetic character recognition of a type which may be used to read standard MICR information on financial instruments such as bank checks.

Bank checks are an important part of a modern financial system. Each year in the United States more than 50 billion checks are processed for payment. To facilitate check processing a set of standards has been created for certain information, such as financial institution and account number, which is printed on blank checks in standard locations. This set of standards, referred to generally as MICR defines the characters and their placement on checks. The MICR characters are written in magnetic ink and, as a result have both an optical image and a magnetic image.

In order to process the large number of bank checks required each day, automated readers have been employed which identify, as well as they can, the information conveyed by the MICR characters on a check. In reality the readers, which move the checks across a reading head, may not be able to read all MICR data due for example, to printing quality, foreign marks in the MICR region of the check or attempts to improperly modify the MICR information. Improvements are needed in methods and apparatus for automatically interpreting MICR characters.

This need is met and a technical advance is achieved in accordance with the present invention which uses both magnetic and optical reading of the MICR characters and identifies characters so read by analyzing data representing both optical and magnetic readings to select which of the MICR characters have been read.

As described herein a check is fed through reading apparatus which identifies the location of the MICR characters and which both magnetically and optically reads the identified character locations. The data for each type or reading is normalized to values suitable for combination of the two types of data which are then merged to form a combined magnetic and optical representation of the scanned characters. The combined scanned data is analyzed by comparison with a combined magnetic and optical representation of a standard character template set. The result of the analysis results in the assignments of character values to the scanned character data.

The combined scanned data and the combined template data may be in the form of vectors which are analyzed or compared using vector analysis tools such as multiplication, error value determination and eigenvector decomposition The analysis of combined magnetic and optical data may be used alone to identify scanned character values or it may be used in conjunction with separate analysis of the scanned optical data and scanned magnetic data. When used with separate data analysis the combined data analysis discussed herein may be used for all scanned characters or for identifying characters where the separate analysis did not sufficiently resolve a character.

DESCRIPTION

Figure 1:
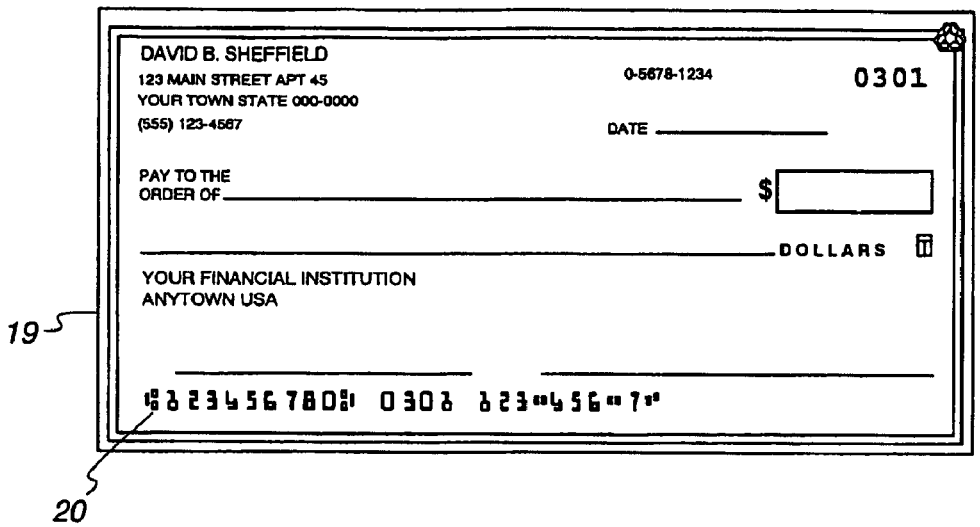
FIG. 1 is a representation of a bank check having MICR characters.

FIG. 1 illustrates a common bank check 19 having imprinted thereon a series of MICR characters 20 which identify significant information to the banking community such as the bank identity and the instrument number. The MICR characters 20 are visually readable and are printed using a magnetic or magnetizable ink. The MICR characters and their placement on the check are standardized and, depending primarily on printing accuracy, can be read using a magnetic reading device which may comprise a plurality of read heads spaced across the standard zone in which the MICR characters are expected. The characters are also visually readable and thus can be scanned by electronic optical scanning apparatus.

Figure 2:
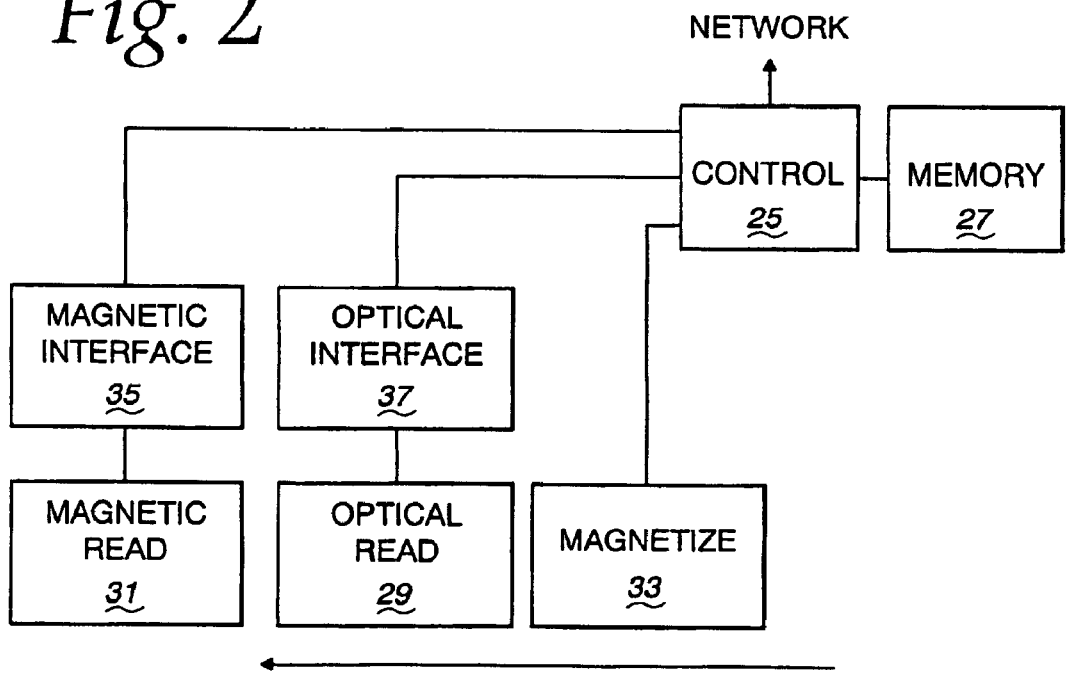
FIG. 2 is a block diagram of check scanning apparatus.

FIG. 2 is a schematic block diagram representing an MICR character scanning device 21 for checks. During the scanning operation a check is moved in the direction of arrow 23 across magnetic and optical readers. The motors and rotating check driving apparatus to move the checks are generally known in the art. One advantageous apparatus for moving checks past readers is disclosed in U.S. application Ser. No. 11/199,685, filed Aug. 9, 2005, which is incorporated herein by reference. The speed of check motion is controlled and synchronized with the MICR reading by a controller 25 so that the characters as read accurately represent the MICR characters as printed. Scanning device 21 includes controller 25 which controls the scanning device 21 to accurately read the check. Controller 25 may include one or more microprocessors (not shown) and a memory 27 for storing a program for the microprocessors and the data collected as well as data representing the expected characters. Data representing the expected characters is referred to herein as MICR character templates. An optical reader 29 and a magnetic reader 31 are used to "read" the MICR characters on the check. Magnetic reader 31 is coupled to controller 25 by means of a magnetic character interface 35. Similarly, optical reader 29 is coupled to controller 25 by an optical character interface 37. Also under the control of the controller 25 is a pre-magnetizer 33 which boosts the magnetic dipole strength in the magnetic ink before the ink is read by magnetic reader 31. As a check is moved through the reading device 21 each of the MICR characters is first magnetized, then read by the optical reader 29 and finally by the magnetic reader 31.

The optical character reader 29 comprises a linear array of optical sensing elements spaced such that 300 dots per inch can be sampled. The optical sensing elements are read by the optical interface 37 in coordination with the movement of the check. The rate of reading the sensing elements is controlled to provide a 300 dot per inch (dpi) scan of the entire check. The light intensities of the sensed dots are each converted into digital pixel form by the optical interface 37 and the full check image is stored by the controller 25. The full image may be provided to banking institutions who use such check images for their customer data bases.

After storage, the collected check image is analyzed to identify the MICR band 20 which should be found at the bottom of the check face in or nearly in the position dictated by the MICR standard. When discovered, each character of the MICR character string will be in a character position approximately 35 dots high and 27 dots long. The beginning of first character position, as well as later characters in the string may be identified by the change of scanned optical pixels from gray to black. After each character position is identified, the image in that character position is compared to each template of the set of optical character templates stored in memory 27. Each comparison with a character template may comprise matrix multiplication in which the pixel value at a given point of the detected optical image is multiplied by the character value at the same (or nearly the same) point of the template. The sum of all of the multiplications for an image in a character position and one of the template is accumulated and used as an indicator of a match with the compared template. This matrix multiplication value is then compared to an image threshold value and the particular template character and its multiplication value are saved as a possible match when the multiplication value exceeds the image threshold value.

The above analysis discusses a single comparison between the image in a character position and each of a plurality of character templates. Advantages may be achieved when shifted comparisons are performed between the image in a character position and each character template. The sampled optical values of the image in a character position may be considered to form a rectangular array 35 pixels high by 27 pixels wide as can the character template. When the two compared arrays are exactly in register a maximum value for the matrix multiplication will be achieved, however such exact registration may not exist with sampled image. Accordingly, the sampled image may be advantageously shifted by a predetermined number of pixels in the vertical direction and a new comparison performed. Such image shifting and comparison may also be performed in the horizontal direction. The largest numerical value for the matrix multiplication after a predetermined number of such spacially adjusted comparisons is then selected as the representation of the image in the character position. After the predetermined number of iterative comparisons has been performed, the largest value and the template character with which the largest value was achieved are compared to a predetermined image value threshold and the character value is ignored when the image value is less than the threshold.

After the comparison of the image in a character position with all template characters has been completed, an analysis occurs to identify the character and a confidence level for the identified character. At this point of the analysis no character value, one character value or multiple character values may be stored in association with each character position. When no matrix multiplication value has achieved the image value threshold, no character is recorded for the character position being analyzed. When one character has been identified, its associated image value is analyzed against predetermined confidence thresholds and a confidence parameter is assigned to indicate confidence in the selected character. The confidence level may be substantially continuous from no-confidence to confidence or it may be in ranges indicating confidence, no-confidence or ranges in between. When more than one character has scored above the threshold value, each is recorded as a possible matching character and each is associated with a no-confidence level as well as a value indicating "nearest neighbor".

Figure 3:
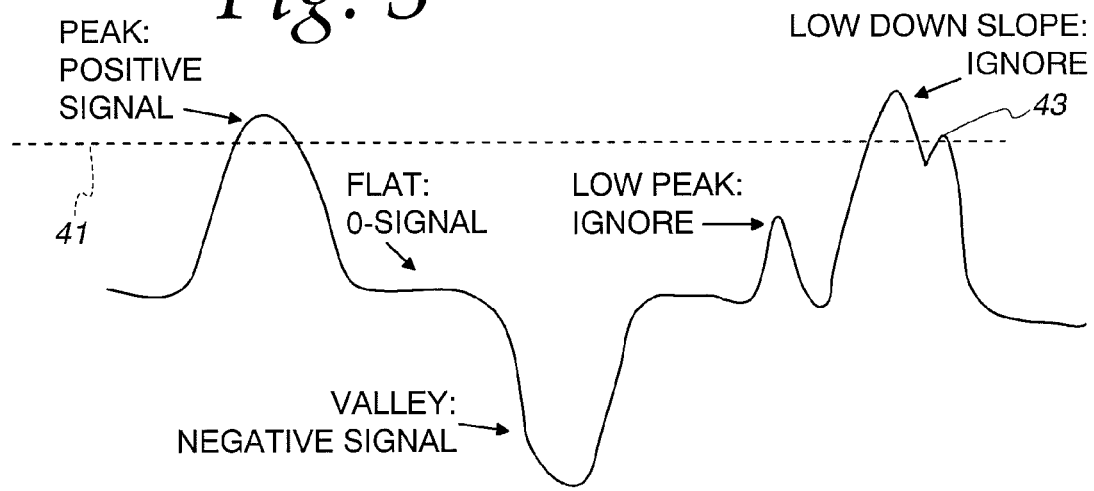
FIG. 3 represents the output of a magnetic scanning element.

The magnetic reader, as previously discussed, consists of a linear array of magnetic read heads. Because no magnetic data is expected on the check except for the MICR character string, the reading heads are disposed to read in the standardized MICR character zone. As the check is moved past magnetic reader 31 traces, such as shown in FIG. 3, are generated and sent to magnetic interface 37 which digitizes the signals and applies the digital representations to controller 25 where they are stored. After the magnetic character data is stored it is analyzed to identify the character positions in the MICR character string and to then analyze the data in the character positions to identify which of the plurality of characters is represented.

The magnetic character recognition begins by identifying the peaks of the magnetic signal to identify the beginning of the character position. Each peak in the incoming data string is identified and when the peak exceeds a predetermined threshold (see line 41 of FIG. 3) its location and value are recorded. In addition to comparing the detected peaks to the peak threshold, false peaks such as shown at 43 are excluded from the data. These false peaks are detected by requiring a down slope after a peak to have a predetermined down slope length. After the peaks are identified they are set to a normalizing peak value and the magnetic data below/between the peaks is set to a normalizing valley value. In a preferred embodiment, the normalizing peak and valley values are the peak and valley values of the character templates. In some embodiments, the data may also undergo phase normalization by shifting the peaks to have spacing expected from the various character templates.

After normalizing the value and position of the detected peaks, character matching begins to identify a character for each detected character position. Magnetic character recognition is performed by comparing the stored data representing magnetic peaks with stored MICR character templates. The comparison comprises matrix multiplication of the peaks in the character position with the values of the template in a manner similar to optical recognition. As with optical recognition, the peaks of the signal in a character position are compared with all of the templates and with regard to any character template, the character position data may be shifted to achieve the maximum value of the matrix multiplication result. Further, it has been found that improved results can be achieved if the location of the individual peaks is varied with respect to the other peaks within a limited range. After the maximum value is found for a character position and character template the value is compared to a threshold and when the threshold is exceeded the character is stored along with its multiplication value. After all character templates have been compared to the data in the character position, a character is assigned to the character position along with an indication of confidence.

When only one character is identified, a confidence value determined from the matrix multiplication is stored in association to indicate high, low or intermediate confidence. In those cases where two characters are identified above the magnetic character threshold they are recorded along with an indication of "nearest neighbor" (low confidence).

It has been determined that improvement may be achieved if each of the optical and magnetic character recognition operations discussed above is undertaken in two stages. The first stage, called the coarse stage, is performed as above described. The second stage, called the strict stage, is undertaken after the coarse stage and is performed using some of the characteristics, such as character position, identified during the coarse stage.

In the coarse stage, the pattern matching determines if the recognized character has a high (above a pre-set threshold) or a low (below the pre-set threshold) level of confidence. This works for most cases, but it occasionally results in recognizing the wrong character, i.e., the algorithm thinks the character is a 5 instead of a 2, defeating the "nearest neighbor" uncertainty check. There are characters that are similar and setting the uncertainty threshold too high results in not recognizing characters. "Too low" and you recognize the wrong character, "too high" and you do not recognize at all. In the strict stage, a second round of stricter matching score calculation is applied to previously recognized characters to improve character recognition.

Both the reference templates and the detected values consist of positive peaks and negative peaks with flat zones between the peaks (FIG. 3). The flat zones of the template characters have a value of zero and flat zones of the detected characters should also have a value of zero. Under the rules of the coarse evaluation stage a zero is added to the matrix multiplication value when either the template or the detected character has a value of zero when the other does not. Under the rules of the strict stage evaluation, when one character, either the template character or the detected character, has a value of zero, the value of the other character is subtracted from the matric multiplication value. Such subtraction constitutes a penalty when one signal is zero and the other is not.

Signal peaks or valleys of the collected character can have values that are actually higher than the corresponding templates. It is true the collected characters are normalized, but using the reference of the character itself instead of a universal reference. In other words the normalization value differs from character to character (some checks have stronger ink than others). As a result, if the collected character's peaks have higher values (strong ink in that check) than the templates the score will be artificially higher (a higher peak value does not define a character better because a character is defined by the presence or absence of a peak). In the stricter score calculation rule, the peak value is clipped at the value of the template. For example, if the template value is 50 and the collected data value is 100, the score would have been 50*100=5000 under the coarse evaluation rules, but under the stricter rules it will be only 50*50=2500. This greatly reduces the chances of recognizing the wrong character. Characters are selected by comparing the matrix multiplication values determined by the stricter rules to a predetermined threshold and selection of the character with the highest value.

In the preceding embodiments the peaks and valleys of the magnetically detected characters are compared to peaks and valleys of the character templates. This method works well when registration of the characters of the detected signal and the template are aligned. There are times when alignment may not be correct because the starting pulse used to detect a character is distorted or a false pulse is present. In these cases, registration will not be correct and character recognition may fail. Evaluating detected magnetic characters in the frequency domain in place of or in conjunction with peak positional evaluation provides a more character position insensitive method for analyzing characters. In this method, the character recognition is done by matching a frequency domain representation of the magnetically detected character with the template in the frequency domain representation of the magnetic signal. Prior to check scanning the standard MICR characters are analyzed and a frequency domain representation of each character is prepared. When scanning or frequency spectrum beginning characters are extracted from the magnetic signal by detecting the approximate location of the starting point of a MICR character and extracting a subset of data that contains the entire character. The starting index of this data set is expanded by N samples to guarantee that the entire character includes all of the starting pulses. The time domain waveform of the area that contains the character is then converted to a frequency representation by performing a fast fourier transform (FFT) or any other method of transforming to the frequency domain. This creates a frequency spectrum of the detected character. The magnitude of the individual frequencies of the spectrum is then calculated by the square root of the square of the real and imaginary components. ($M=sqrt(x^2=y^2)$). Finally, the detected frequency spectrum is compared against the frequency spectrums of a set of character templates to find a best character match.

Although optional, it is suggested that before the frequency domain template matching is performed the signal power in the frequency domain is normalized. Variations in inks and hardware can cause the signal amplitude of the magnetic characters to vary. To remove that variable from the recognition algorithm, the power in the character waveform is always normalized to 1 before a template match is performed. Also, it has been found that the removal of high frequency components of the spectrum before matching with the template may improve recognition results. Removal of higher frequencies is desirable because the detected magnetic waveform often has spurious signal components that are not from the character to be recognized, such as signal dropouts, noise, sudden acceleration/deceleration and other such problems. These sources of errors are usually faster transients than the expected signal and can be removed by discarding the high frequencies in the frequency domain signal.

While the frequency domain matching is relative insensitive to precisely detecting the character starting point, missing it by a large number of samples may create errors, the locating of the character starting point can be improved by integrating the magnetic signal and then looking at the locations where the integrated signal goes to zero. The signal picked up by the magnetic head is the derivative of the magnetic ink passing across the head. Integrating this signal yields the amount of ink under the head at any point in time. When this integrated signal goes to zero, we know we have no ink under the head and are at a blank space between characters. The midpoint of a blank space identified by the integral can be used as the starting point of next character to be read. This method can also be used to locate characters in the time domain algorithm.

Cepstrum is the Fourier transform of a spectrum. It is thus the spectrum of a spectrum, and has certain properties that make it useful in many types of signal analysis. One of its more powerful attributes is the fact that any periodicities, or repeated patterns, in a spectrum will be sensed as one or two specific components in the cepstrum. If a spectrum contains several sets of sidebands or harmonic series, they can be confusing because of overlap. But in the cepstrum, they will be separated in a way similar to the way the spectrum separates repetitive time patterns in the waveform. False responses to such things as gearboxes and rolling element bearing vibrations may be avoided by cepstrum analysis.

Thus, an additional power spectrum (Cepstrum) calculation may further enhance identification of the character. When matching against a template in the frequency domain some characters are more likely than others to give an incorrect match because spectral lines are in similar locations. For those characters, an additional processing step is to be performed to further discriminate between close character. A cepstrum is performed and a cepstrum template used for the match.

Figure 4:
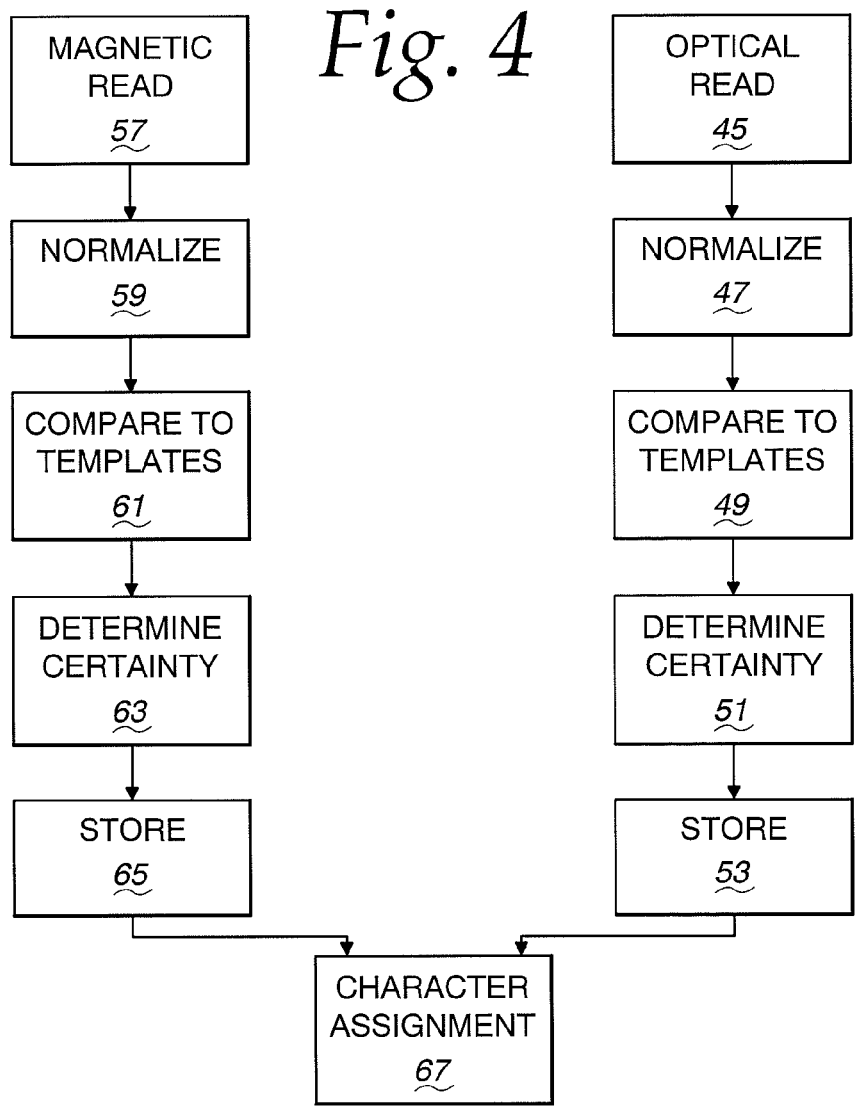
FIG. 4 is a flow diagram of a first character recognition process.

After characters have been assigned to each character position using both optical and magnetic analysis the data is accessed and used together to obtain a final selected character. FIG. 4 is a flow diagram representing the analysis of magnetic and optical data to assign a character to each character position, if possible. In FIG. 4 the optical analysis begins at step 45 where the optical data is read from the check. A step 47 is then performed to normalize the data and the normalized data is compared with the character templates in step 49 to determine a character (or characters) for each character position in step 51. A confidence value is also determined in step 51 and for each character position an identified character and its confidence value is stored in step 53.

The analysis of the magnetic data begins at step 57 in which the magnetic character data is read from a check. In a step 59 the magnetic data is normalized which, as discussed above, can be both in amplitude and position of detected peaks. The normalized data is then compared in step 61 to character templates in a step 61 to identify a character for each character position and in step 63 a certainty value is identified for each identified character. After determining the certainty factor, a representation of each character identified for each character position is stored along with a certainty parameter.

At the completion of step 65, a step 67 is performed in which a character is assigned to each position based on the magnetic characters and confidence levels stored in step 65 and the optical characters and confidence levels stored in step 53. Character assignment in step 67 is performed with a set of rules described immediately below. When both the magnetic and the optical characters are the same and confidence for both is high, assign the selected characters. When the magnetic character has high confidence and the optical character for the same character position has low confidence, assign the magnetic character. When the magnetic confidence is low and the optical character has a high confidence parameter, assign the optical character to the character position. When both the optical character and the magnetic character indicate a low confidence, fail the analysis and re-read the check or resort to other analysis operations such as visual analysis. Finally when both characters have high confidence parameters but identify a different character, fail the analysis.

The preceding embodiments involve the separate analysis of optical scan data and magnetic scan data and the combination of the results of the analysis. An additional analysis tool is discussed below in which the optical scan data and magnetic scan data are combined before analysis of the scanned data. Such a tool may be used independently of the prior separate analysis embodiment or it may be used in conjunction with separate analysis. For example, when separate analysis does not provide sufficiently certain character assignment the joint analysis tool may be employed to provide additional certainty for all or selected character positions. Also for example, the analysis of combined data may be employed in place of all separate analysis. It is presently envisioned that a combination of joint and separate analysis provides the best results.

The specification of the MICR font defines the magnetic characteristics of a fourteen character set including the numbers zero through nine inclusive and four specialty characters. Each character is defined by the response of a specified magnetic measurement circuit and the position and amplitude of positive and negative peaks. There are seven measurement regions which define each character. Since there are fourteen characters defined by these measurements, this is generally referred to as an under determined system. As an under determined system, mathematically, this means that characters can be formed by linear combinations of other characters, hence, they are not orthogonal nor are they completely unique.

The Optical Characteristics of an MICR characters are significantly less strict than the magnetic characters in the specification. They are specified by a seven (7) wide by nine (9) tall grid. While the system has sixty-three unique measurement points which define an over determined system allowing the implementation of high end signal processing techniques, the ease with which the optical data can be corrupted by normal actions makes implementation difficult and potentially error prone.

Prior recognition systems have been limited to techniques such as peak counting and placement or envelope matching. These systems work to a reasonable level but misreads or non reads may occur as print quality varies. In particular, the recent acceptance of laser printed documents has created significant challenges since the dimensions of the MICR font characters do not fix integrally into the print capability of the laser printer. As such, characters often fail to meet the specified dimensions. Several of the characters have heuristically similar waveforms with the only differentiator being width of a zone of no signal.

Print quality, which, when poor, may cause magnetically read waveforms to be smeared or have peaks in the wrong places. This may cause a misread on many check readers relying simply on magnetic signatures. Envelope evaluation systems will contain large amounts of energy outside the envelope which will cause high energy counts. As such they will fail to recognize a character. Or possibly, the peaks may be shifted to a new region which would cause a misread.

Magnetic systems are also subject to Electromagnetic Interference (EMI) commonly produced by monitors and merchant theft detection devices which are frequently located next to a MICR reading device. This causes extra peaks to appear or possibly even washes out existing peaks on some characters which have small strokes. This could again cause peaks in the wrong places and energy outside the envelope window. A second set of issues involves mechanical transport of the documents which can produce misreads due to waveform corruption (elongation of characters, shortening of characters etc.)

At the point of sale and bank environment, an interesting problem occurs when a check holder folds the document prior to submission. When the crease falls within a character stroke, artificial spikes can be created, potentially causing problems with a magnetic recognition system.

The application of Optical Character Recognition techniques introduces some practical problems as well. While mechanical variations are less problematic there are frequently issues with corruption of the optical data caused by normal usage, such as crossover from the signature field into the MICR line by tailed characters such as "j", "y", "g" etc. Such crossovers produce strokes in the optical field which can confuse a recognition system. Similarly, smears of the MICR ink may have a greater impact on the optical character than the magnetic or even just dirt from carrying in one's wallet or pant pocket can cause problems with Optical reads. Less important but still problematic for some algorithms is the background which is present on a check which can cause confusion as to what is the character and what is background information.

Advantages may be achieved over the systems discussed above which separately analyze optical and magnetic data and neglects the fact that simultaneous measurement of the same data with multiple sensors ignores possibly critical information which can be used across the system. With the present embodiment multispectral signal processing is proposed to gain a recognition advantage. A measurement error typically only impacts one spectra of data. An extra stroke created by a flagged character will be visible in the optical data but not the magnetic data. A magnetic character whose signature has been changed due to a mid character fold will not have the same impact on the optical signature.

Figure 5:
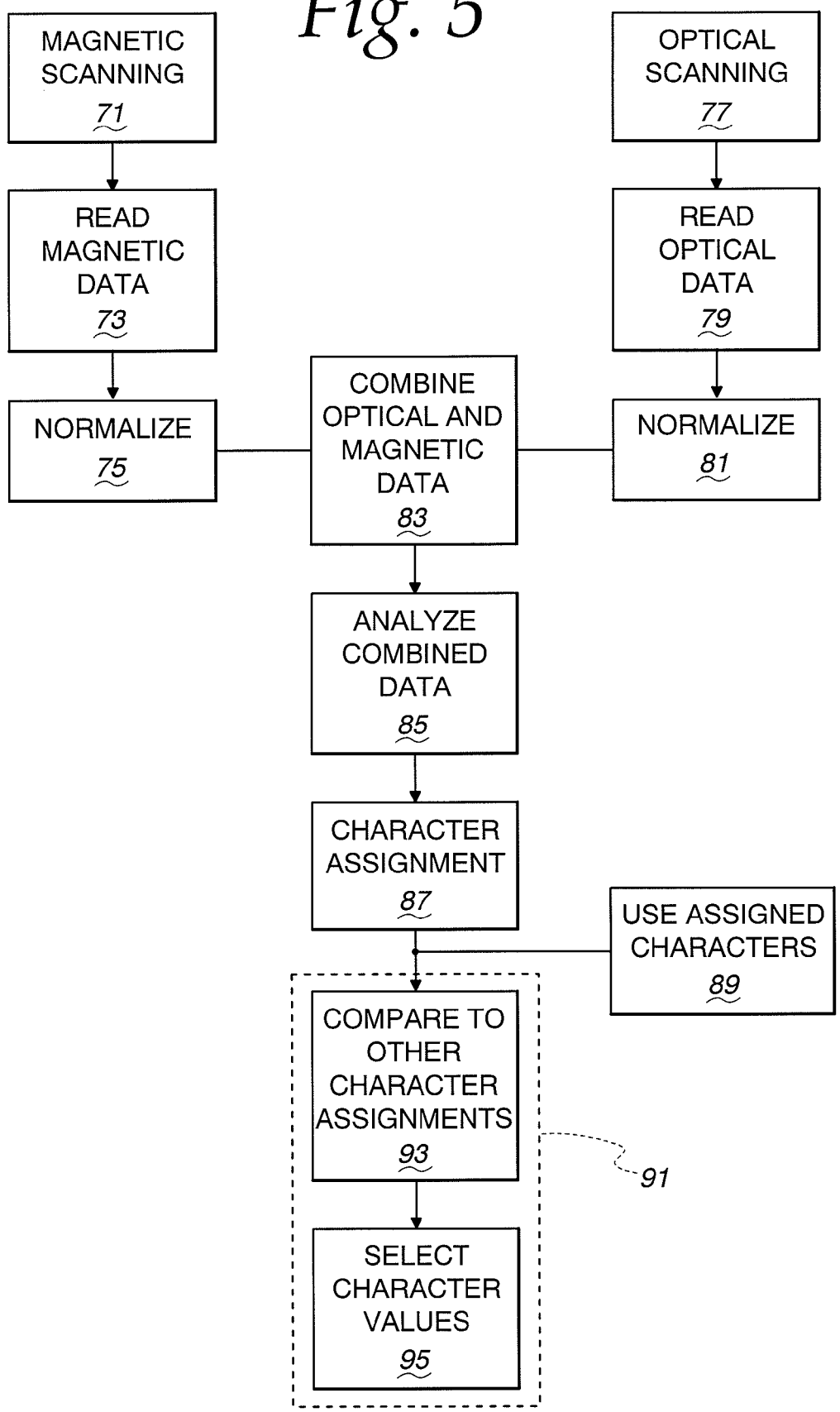
FIG. 5 is a flow diagram of a second character recognition process.

FIG. 5 is a general flow diagram representing multispectral analysis. Initially, a check is scanned as discussed with regard to FIG. 2 to produce optical character data and magnetic character data representing the scanned MICR character set. Magnetic scanning is represented at block 71 and optical scanning is represented at block 77 of FIG. 5. It should be mentioned that the character scanning represented in blocks 71 and 77 may already have been performed and optical character data and magnetic character data may already be stored in the control 25 and memory 27. The magnetic character data is read from storage in block 73 and normalized in block 75 to a standard for combination with optical character data which is read from storage in block 79 and also normalized for combination in block 81.

The normalized optical data (block 81) and the normalized magnetic data (block 75) are then provided to a combining step 83. The combining step aligns the data based on character start positions and forms a vector representation of the combined data. An analysis step 85 is then performed, the results of which are applied to a character assignment step 87. In cases where the multispectral analysis is the only or controlling analysis, flow proceeds to block 89 where the characters assigned in block 87 are used. Alternatively, in cases where the character assignments of block 87 are to be used in conjunction with other types of analysis an optional procedure represented in dashed box 91 is performed. In the optional procedure, the character values assigned in block 87 are compared in block 93 with other possible assigned values, such as from separate optical and magnetic analysis, and a character value decision is made at block 95.

In the analysis block 85 optional types of data evaluation of the combined data may be performed. For example, prior to analysis, data representing combined optical and magnetic scans of the standard templates may be created as a combined template. The combined scanned data may then be analyzed in block 85 by comparison with the combined template data. Such comparisons may comprise matrix multiplication and selection as described above with regard to FIG. 2. Alternatively, error analysis may be performed. With error analysis, the combined data vector is analyzed for error when compared to the combined template.

In the present scanning technique there are a finite set of acceptable data patterns for the character set, fourteen (14) to be precise. Each character has a known desired combined template signal. The following discussion is independent of the MICR font recognition problem, extracted from generalized statistical theory. First, establish $$d = wm + e$$

where m represents the measured data, w represents a filter operation, d represents the desired character waveform and e represents an error component associated with the measurement (all bold characters represent vectors of data). By making the usual assumptions on the error component, that it is white guassian noise, we state that the expectation value of the error of a period of time is 0.

$E[e(n)] = 0$ with an autocorrelation function $\delta(n) = \sigma^2$ for $i = 0$ only, otherwise the autocorrelation function = 0.

The Error Estimate is then:

$$\xi est = \sum |d_{est}(n) \wedge 2|$$
$$= \sum \sum \sum w_i w_k^* \, m(n-k) \, m^*(n-t)$$

The last two terms, m and m* relate to the autocorrelation matrix $\Phi$ of the measured data so the error reduces to $$\xi est = w^H \Phi w$$

Given the estimate of the error for each character, the minimum error is then:

$$\xi min = \xi d - \xi est$$
$$= \xi d - w^H \Phi w$$

Further, the $\xi est$ can be recast in terms of strictly the desired data and the measured data removing the requirement to actually calculate the filter itself:

$$\xi min = d^H d - d^H A (A^H A)^{-1} A^H d$$

where A is defined as a data matrix (a vector) and recall that d is simply the vector representing the character we desire to test to see if it can produce a minimum error result. All this is independent of the problem of selecting characters and is a general and well documented mathematical conclusion (ref: Adaptive Filter Theory, Simon Haykin and others).

Since we are merging the data of the over determined optical measurements with the under determined magnetic measurements, a system exist that is, by definition over determined meaning each character is orthogonal to each other character. As such, only one character can provide a minimum error estimate $\xi min$ and hence, the selected character is the character with the minimum error. As a final check the filter w is calculated which should yield the desired waveform for the validation. By utilization this approach, any improperly placed marks will be weighted as an error.

Eigenvector decomposition may also be used as an analysis tool in block 85. As mentioned above, an autocorrelation matrix, $\Phi$, can be generated from for the combined template data set which contains all the known characters in the font set. This matrix can be subjected to an Eigenvalue Decomposition which will produce a set of eigenvalues ($\lambda i$) and eigenvectors (ei). The eigenvectors, by definition, produce a set of orthogonal vectors, each one representing a filter for the unique attributes of the signals in question. As such, they produce a series of filters which, when applied to a signal, produce a set of subspaces, each one containing only data that is coherent with the subspace associated with the eigenvalue.

The analysis of the combined scanned data may employ eigenvector decomposition as a preprocessor which allows operating the filters associated with each character on the character waveform. The result would be a set of signal subspaces, one subspace per character along with a noise subspace which captures anything which is not part of a character (background for example). This would leave processing of the signal subspaces for recognition. This preprocessing in some cases reduces the opportunity for interference to impact recognition.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A method of evaluating a set of printed MICR characters, comprising:
    providing a template data file representing values of standard template MICR characters;
    scanning the printed set of MICR characters and accumulating character data representing the scanned characters;

first evaluating the character data against the template data file using a coarse analysis method to identify the scanned characters and to identify scanned character characteristics;

second evaluating the character data and the scanned character characteristics identified in the first evaluating step against the template data file using a strict analysis method;

identifying characters in response to the second evaluating step;

wherein the first and second evaluating steps comprise matrix multiplication of the template character data and the accumulated character data and the strict analysis method of the second evaluating step further comprises subtracting from the matrix multiplication a value representing differences between the template character data and the accumulated character data.

2. The method of claim 1 wherein the coarse analysis method of the first evaluating step comprises first normalizing the character data to a first normalized value.

3. The method of claim 2 wherein the first normalized value is determined from peak values of the accumulated character data.

4. The method of claim 3 wherein the strict analysis method of the second evaluating step comprises normalizing the character data to a second normalized value determined from peak values of the template data file.

5. The method of claim 4 wherein the second normalized value clips peal values of the accumulated character data to peak values of the template data.

6. The method of claim 1 wherein the strict analysis method of the second evaluating step comprises subtracting from the matrix multiplication an amount representing a value of the accumulated character data when the template character data has a value of zero.

7. The method of claim 6 wherein the strict analysis method of the second evaluating step comprises subtracting from the matrix multiplication an amount representing a value of the template data when the character data has a value of zero.

* * * * *